United States Patent
Morinaga

(10) Patent No.: US 7,664,024 B2
(45) Date of Patent: Feb. 16, 2010

(54) VOIP NETWORK SYSTEM FOR MULTICASTING PACKETS AND A METHOD OF CONSTRUCTING THE SAME

(75) Inventor: Tomoya Morinaga, Tokyo (JP)

(73) Assignee: Oki Semiconductor Co., Ltd. (JP)

( * ) Notice: Subject to any disclaimer, the term of this patent is extended or adjusted under 35 U.S.C. 154(b) by 418 days.

(21) Appl. No.: 11/808,295

(22) Filed: Jun. 8, 2007

(65) Prior Publication Data
US 2007/0291769 A1 Dec. 20, 2007

(30) Foreign Application Priority Data
Jun. 15, 2006 (JP) .............................. 2006-165764

(51) Int. Cl.
H04L 12/66 (2006.01)
H04L 12/56 (2006.01)

(52) U.S. Cl. .................. 370/230; 370/352; 370/395.21; 370/389; 370/401

(58) Field of Classification Search ................. 370/230, 370/400, 401, 352–356, 241, 260, 389, 465, 370/395.21, 395.52
See application file for complete search history.

(56) References Cited
U.S. PATENT DOCUMENTS
2003/0099245 A1* 5/2003 Kim et al. .............. 370/395.52
2003/0219011 A1* 11/2003 Han ............................ 370/352
2004/0252691 A1* 12/2004 Hori et al. ................... 370/390
2006/0045074 A1* 3/2006 Lee ............................. 370/352
2006/0221837 A1* 10/2006 Gardner et al. .............. 370/241

FOREIGN PATENT DOCUMENTS
JP 2003-134117 5/2003

* cited by examiner

Primary Examiner—Afsar M. Qureshi
(74) Attorney, Agent, or Firm—Studebaker & Brackett PC; Donald R. Studebaker

(57) ABSTRACT

In a VoIP network system, when a host terminal detects a link with a network, a connection-time determiner determines the time required for reconnection from a disconnection time when a link with the network was disconnected before to an establishment time when a link with the network is reestablished. If the time required for connection is shorter than a predetermined period of time, the connection-time determiner determines that address information is not to be transmitted since the time required for connection is too short to transmit the address information. Otherwise, the connection-time determiner determines that the address information is to be transmitted. According to a result of the determination, self-address information is transmitted by multicast communication to other terminals.

22 Claims, 6 Drawing Sheets

VOIP NETWORK SYSTEM FOR MULTICASTING PACKETS AND A METHOD OF CONSTRUCTING THE SAME

BACKGROUND OF THE INVENTION

1. Field of the Invention

The present invention relates to a VoIP (Voice over Internet Protocol) network system of a peer-to-peer type in which host terminals transmit or receive packets by multicast communication to one another without a server, and a method of constructing such a VoIP network system.

2. Description of the Background Art

Conventionally, VoIP network systems are constructed without a server. There is known a peer-to-peer network in which terminals communicate unicast packets to directly each other.

Japanese patent laid-open publication No. 2003-134 discloses an IP (Internet Protocol) telephone set that utilizes VoIP to make conversation. If the IP telephone set receives from an operator a call originating request accompanied by the telephone number of a party to be called, the IP telephone set sends a multicast packet containing that telephone number to a local area network (LAN), obtains a response packet to the multicast packet, and sets the source IP address of the response packet into the IP address of the called party.

In addition, U.S. patent application publication No. 2004/0252691 A1 to Hori et al., discloses a VoIP system. In the VoIP system, in response to a request from a client, a VoIP server transmits multicast packets to other clients. At this time, the VoIP server determines whether or not the other clients are able to receive multicast packets. To clients determined to be capable of receiving multicast packets, data is transmitted in the form of multicast packets. To clients determined to be incapable of receiving multicast packets, data is transmitted in the form of unicast packets.

However, in the conventional VoIP network systems, for example, if a certain host terminal sends its own address information to other respective host terminals by unicast packet communication on a one-to-one terminal basis, the former host terminal has to transmit a number of packets that corresponds in number to the destination host terminals. Particularly, in the case where packets are transmitted through routers to other host terminals outside a closed network, the number of packets to be transmitted is increasing explosively, so that network load is increasing exponentially and packet traffic on the network is getting heavier and heavier.

SUMMARY OF THE INVENTION

It is an object of the present invention to provide a VoIP network system and a method of constructing a VoIP network system which are capable of reducing the traffic conveying packets to be transmitted, on a peer-to-peer network in which host terminals transmit or receive packets by multicast communication to one another directly without a server.

In accordance with the present invention, there is provided a VoIP network system of a peer-to-peer type in which a plurality of host terminals transmit or receive packets by multicast communication to one another. In the system, each host terminal comprises a connection-time determiner for determining, if it detects a link with a telecommunications network of the system, time required for reconnection from disconnection time when a link with the network was disconnected before to establishment time when a link with the network is reestablished. According to a result of the determination obtained by the connection-time determiner, the host terminal transmits its self-address information by the multicast communication to other host terminals.

In accordance with the present invention, there is provided a method of constructing a network of a VoIP network system of a peer-to-peer type in which a plurality of host terminals transmit or receive packets by multicast communication to one another. The method comprises a connection-time determining step of determining, if one host terminal detects a link with the network, time required for reconnection from disconnection time when a link with the network was disconnected before to establishment time when a link with the network is reestablished. According to a result of the determination of the time required for reconnection, the connection-time determining step transmits self-address information of the host terminal by the multicast communication to other host terminals.

According to the VoIP network system of the present invention, a host terminal transmits a packet by multicast communication under an IPv6 environment. Therefore, in the transmitting and receiving of address information between host terminals, if only one multicast packet is transmitted per local link scope, address information can be transmitted to all host terminals, so that packet traffic over a network can be reduced. Thus, the VoIP network system of the present invention is constructed without a server and operated with reduced traffic.

Even in the case where packets are transmitted outside local link scope beyond a router, as with the aforementioned, a host terminal is required to transmit only a single multicast packet. This results in an appreciable reduction in number of packets to be transmitted to a telecommunications network, whereby network load can be drastically reduced.

According to the VoIP network system of the present invention, when a host terminal detects a link with a network, the connection-time determiner determines the time required for reconnection from disconnection time when a link with the network was disconnected before to establishment time when a link with the network is reestablished. If the time required for reconnection is shorter than a predetermined period of time, the connection-time determiner determines that address information is not to be transmitted since the time required for connection is too short to transmit the address information. Otherwise, the connection-time determiner determines that the address information is to be transmitted. By transmitting self-address information by multicast communication to other terminals according to a result of the determination, the number of packets to be transmitted over a network is reduced, whereby packet traffic on the network can be reduced.

In the VoIP network system of the present invention, when a host terminal receives a telephone number for a call connection and does not have address information corresponding to that telephone number, the host terminal transmits retrieval information by multicast communication to retrieve the corresponding host terminal. At this time, the retrieval information is sent to narrow scope, and if the destination host terminal is not found out, the retrieval scope is gradually broadened. For instance, the retrieval scope is broadened stepwise in the order of link local scope, site local scope, and global scope. This prevents waste packets from being transmitted, resulting in a reduction in packet traffic over a network.

BRIEF DESCRIPTION OF THE DRAWINGS

The objects and features of the present invention will become more apparent from consideration of the following detailed description taken in conjunction with the accompanying drawings in which.

DESCRIPTION OF THE PREFERRED EMBODIMENT

Figure 1:
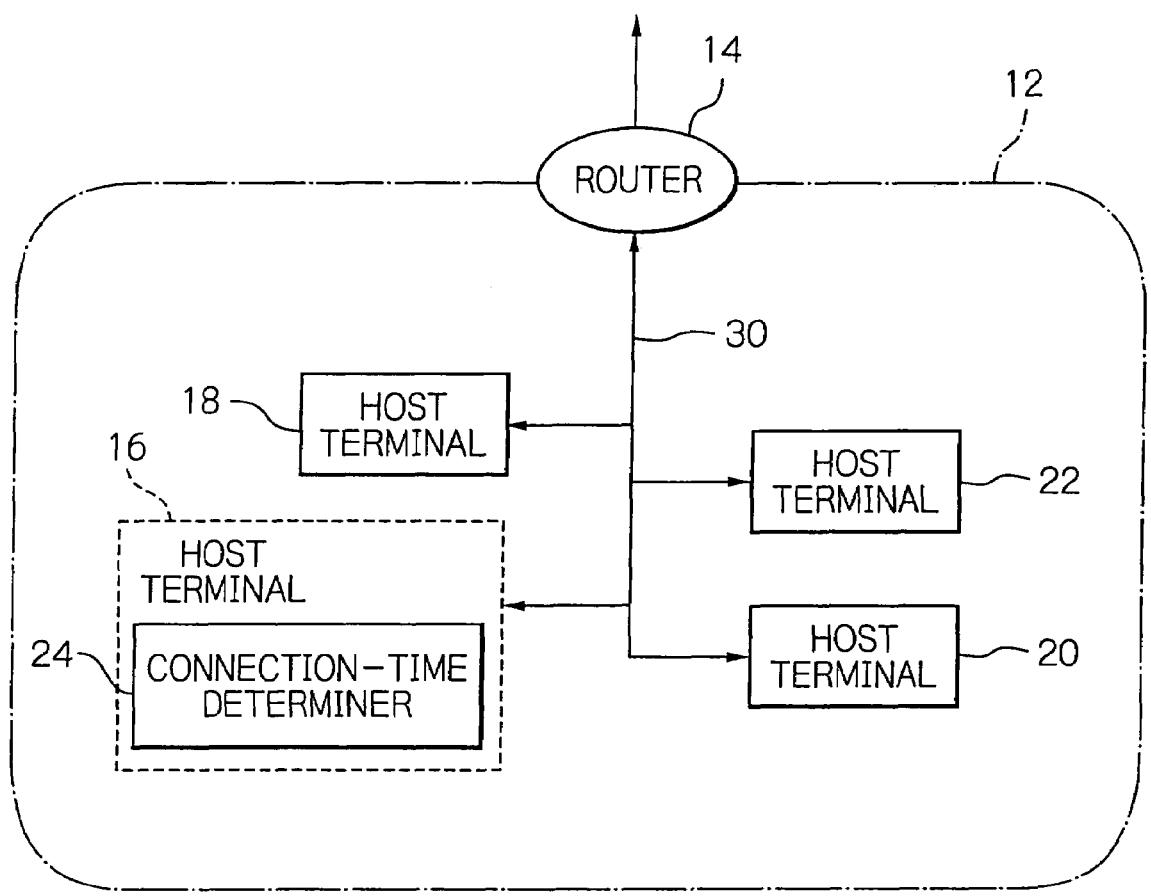
FIG. 1 is a schematic block diagram showing an embodiment of a VoIP network system in accordance with the present invention.

With reference to the accompanying drawings, a preferred embodiment of a VoIP (Voice over Internet Protocol) network system according to the present invention will hereinafter be described in detail. For example, as shown in FIG. 1, in the VoIP network system of the present embodiment generally designated by a reference numeral 10, a plurality of host terminals 16, 18, 20, and 22 are connected to a router 14 disposed in a telecommunications network 12, and predetermined one of the host terminals transmits or receives a packet by multicast communication to the other host terminals, whereby a peer-to-peer type of VoIP network system is constructed. It is noted that parts or elements not directly relevant to understanding the present invention will neither be described nor shown for avoiding redundancy.

The VoIP network system 10 of the instant embodiment may of the type of constructing a telecommunications network by transmitting or receiving packets by the multicast communication under an IPv6 (Internet Protocol version 6) environment. The VoIP network system 10 may be of the type of transmitting multicast packets using a session initiation protocol (SIP) or other internet protocols (IPs).

In the illustrative embodiment, the VoIP network system 10 may include a number of subnetworks, but FIG. 1 shows the single network 12 merely for simplicity.

The network 12 includes the router 14 and the host terminals 16, 18, 20, and 22 connected to the router 14. In the illustrative embodiment, the network 12 may include a number of host terminals, but FIG. 1 depicts only a small number of host terminals 16, 18, 20, and 22 also for the purpose of simplicity.

The network 12 is constructed with, for instance, a sole link local address based on IPv6, and is of a single link, that is, a network such as a wired and/or wireless LAN (Local Area Network) formed over a local link area in a range not extending beyond a router, i.e. router 14 in this example.

The network 12 of the illustrative embodiment may be of the type constituting part of a site local area formed at a particular strongpoint, the site local area constituting part of a global network area that extends all over the world. The network 12 may be of the type constituting part of the global area.

The router 14 functions to support multicast communication that is established between a plurality of host terminals 16, 18, 20, and 22 connected to the router 14, and operates, for example, under an IPv6 environment. The router 14, for instance, receives a multicast packet sent by any host terminal in the network 12 and transmits that multicast packet to outside the network 12, while receiving a multicast packet sent from outside the network 12 and transmitting that multicast packet to the host terminals 16, 18, 20, and 22 in the network 12.

In FIG. 1, although the router 14 is electrically connected, i.e. wired in hardware, to a plurality of host terminals 16, 18, 20, and 22 by connections 30, the router 14 may be in wireless or radio communication therewith.

The host terminals 16, 18, 20, and 22 transmit or receive multicast packets and have a VoIP function, for example, under an IPv6 environment. The host terminals 16, 18, 20, and 22 include a call control function, or call controller, not shown, of originating or terminating a call to thereby cause a call connection and communication to be established with one another. The host terminals 16, 18 and 20 are adapted to record call originations and terminations in the form of history of call connections.

The host terminal 16 of the illustrative embodiment functions to transmit its own address information by the multicast communication to other host terminals, when it is connected to the network 12, i.e. when it detects a link with the network 12. As the address information, the host terminal 16 may transmit, for example, a telephone number, an IP address, and SIP URI (Uniform Resource Identifier). The host terminal 16 functions to detect the disconnection and establishment of a link with the network 12, for example, when a LAN cable connected to the network 12 is pulled out and put in, respectively.

In the illustrative embodiment shown in FIG. 1, the host terminal 16 includes a connection-time determiner 24, which is able to determine, according to the time required for reconnection from disconnection time when a link with the network 12 was disconnected before to establishment time when a link with the network 12 is reestablished, whether or not its own address information is to be retransmitted. The host terminal 16 functions to transmit its own address information according to a result of the determination obtained by the determiner 24.

The connection-time determiner 24, for example, may store disconnection time on a memory device, not shown, when disconnecting a link between the host terminal 16 and the network 12. The determiner 24 obtains establishment time when a link is established between the host terminal 16 and the network 12, and obtains a difference between the establishment time and the stored disconnection time, i.e. the time required for connection. For instance, the determiner 24 compares the time required for connection with a predetermined comparative or reference value. As a result of the comparison, if the time required for connection is within a predetermined period of time, the determiner 24 determines address information not to be transmitted because the time required for connection is too short to retransmit the address information, and otherwise determines that address information is to be transmitted.

The host terminal 16 is also able to receive address information, such as a telephone number, an IP address, and SIP URI, in the form of a multicast packet from other host terminals. In receiving a multicast packet containing the address information of another host terminal, the host terminal 16 is able to record the time-stamp of the multicast packet, for instance, reception time.

The host terminal 16 of the illustrative embodiment further includes a storage device or area, not shown, for storing address information received. The terminal 16 functions to determine address information received and, according to a result of the determination, store it on the storage device. The host terminal 16 may also store the time-stamp of the reception time of address information on the storage device in connection with the address information.

After receiving address information from another host terminal, the host terminal 16 references the storage device to determine whether or not address information corresponding to the received address information has already been stored. When the host terminal 16 finds out the corresponding address information from the storage device as a result of the determination, the terminal 16 updates the storage device according to the received address information. On the other hand, when the host terminal 16 is unable to detect the corresponding address information, it additionally stores the received address information on the storage device.

When updating the storage device, the host terminal 16 compares the time-stamp of received address information with that of the already-stored corresponding address information and stores the newer of the two pieces of information. On the other hand, when adding and storing received address information, if there is no vacancy on the storage device, the host terminal 16 functions to determine and delete unnecessary address information according to the time-stamp of address information already stored on the storage device and/or the transmission-reception history. For example, among plural pieces of address information that are smallest in number of call originations and terminations, the host terminal 16 determines the address information received at the oldest time-stamp to be unnecessary information.

For instance, if a user dials and inputs the telephone number of a host terminal other than his or hers 16, then the host terminal 16 also functions to connect with the other host terminal for a conversation, based on the input telephone number. With respect to address information such as an IP address or SIP URI which corresponds to the input telephone number, the host terminal 16 originates a call by unicast communication to request a connection to the other, i.e. called host terminal, and receives a response from the other host terminal and causes a call connection to be established with the other host terminal. The host terminal 16 transmits and receives multicast voice packets to and from the called host terminal, thus establishing a conversation with the called party.

The host terminal 16 of the illustrative embodiment is configured so that it references the storage device based on an input telephone number, retrieves address information such as an IP address or SIP URI which corresponds to that telephone number, and transmits a connection request and voice packets by the multicast communication to the address information that was retrieved. When the host terminal 16 is unable to locate the address information corresponding to the input telephone number from the storage device, the host terminal 16 transmits search information containing the input telephone number by the multicast communication to search for the destination host terminal.

The other, i.e. called host terminal, when having received the search information, transmits its own address information as a response to the search information, if the input telephone number represented by the search information is the same as its own telephone number.

The host terminal 16 obtains address information such as an IP address or SIP URI from the destination host terminal, as a response to the search information, and additively stores the address information on the storage device. The host terminal 16 also transmits a connection request and a voice packet by the unicast communication to this address information. The host terminal may be adapted to determine, when the host terminal 16 receives responses from a plurality of host terminals, the time-stamps of the responses to select the newest one.

If all of the host terminals 16, when searching for a destination terminal, would send out search information to a global scope, packet traffic in a network would have been heavy. Therefore, the host terminal 16 of the illustrative embodiment is adapted so that it first sends out search information to narrow scope and, if no destination terminal is found out, then gradually broadens the scope of the search.

The remaining host terminals 18, 20, and 22 may be configured the same as the host terminal 16 described above.

Figure 2:
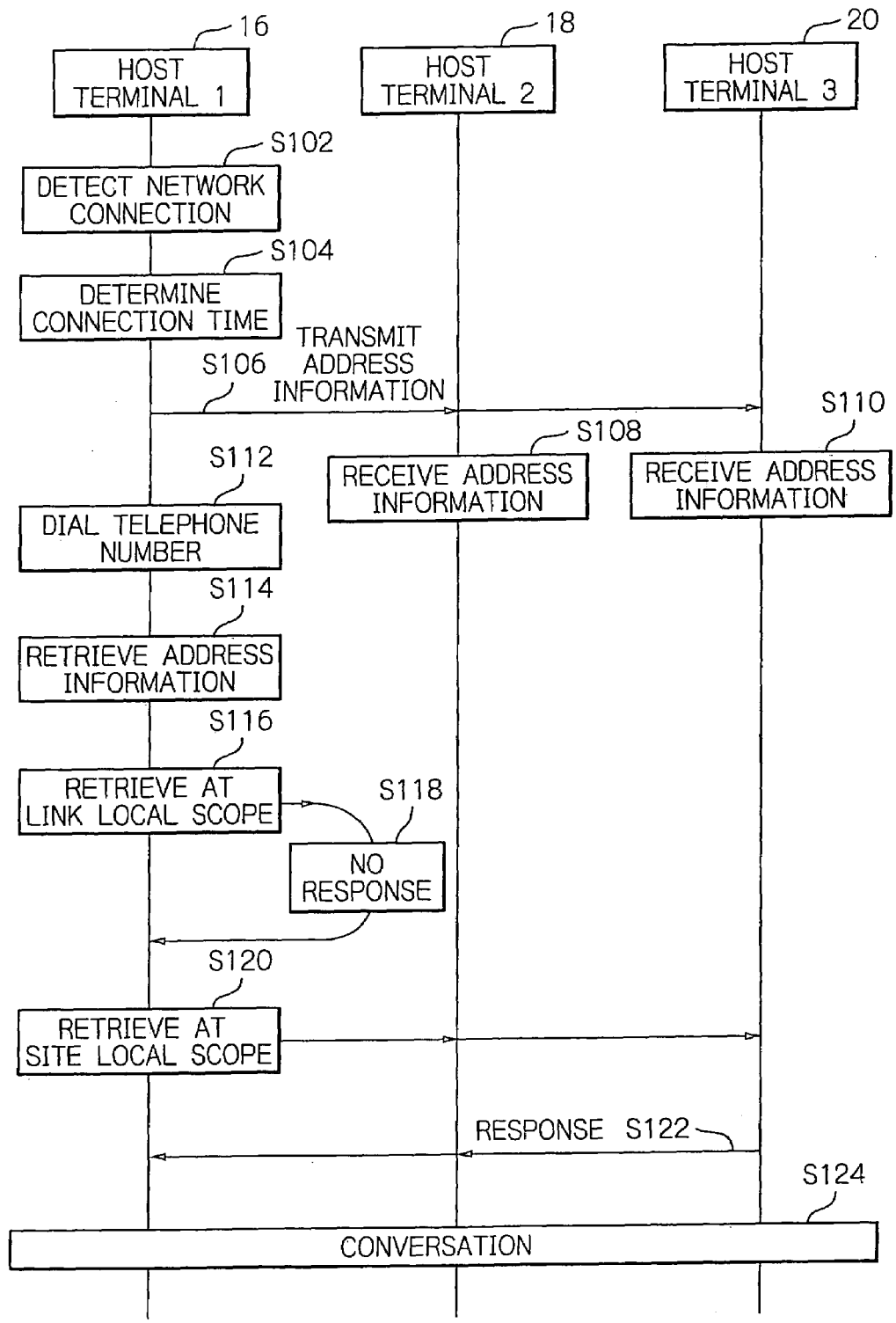
FIG. 2 is a sequence chart useful for understanding how the VoIP network system shown in FIG. 1 operates.
Figure 3:
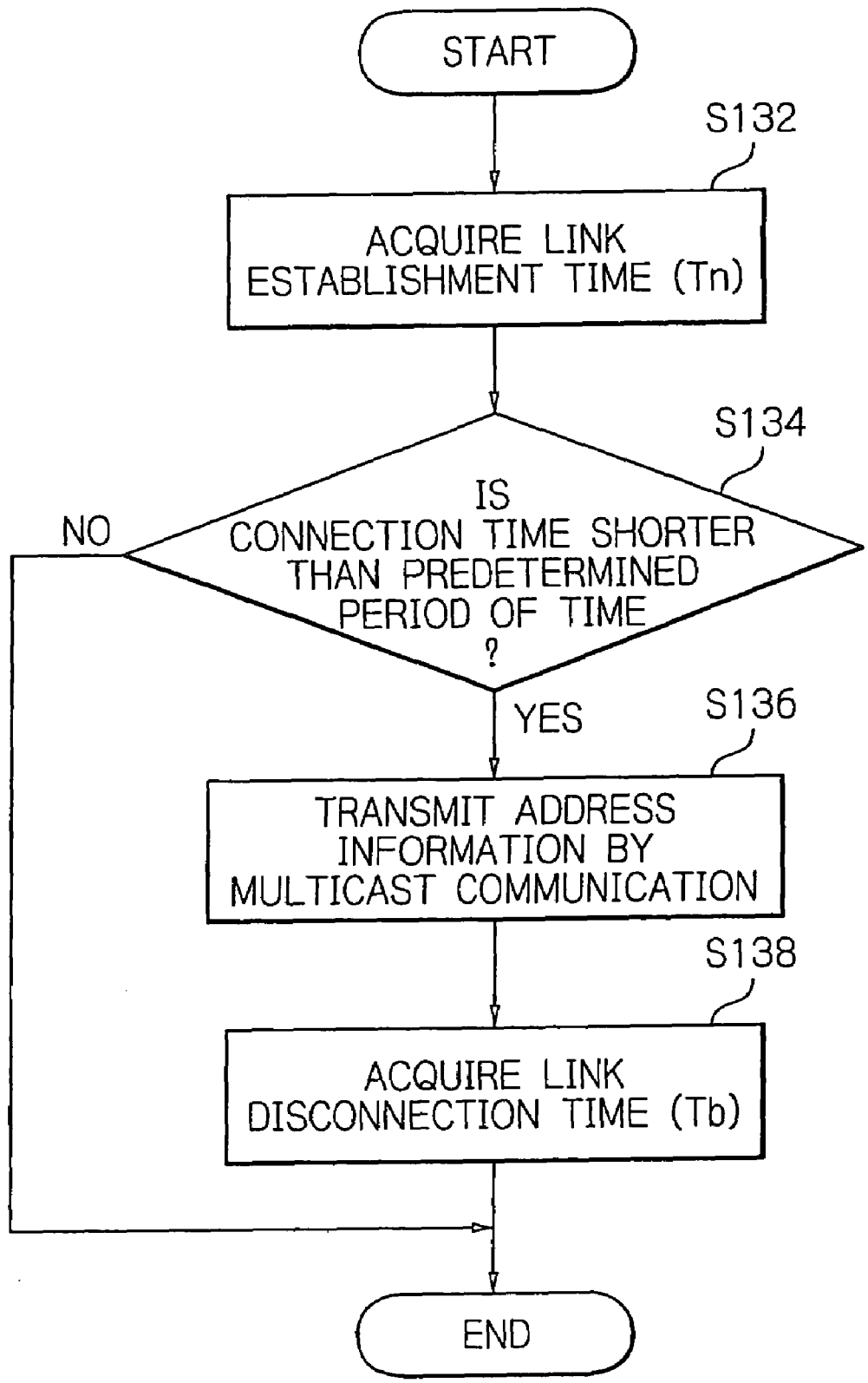
FIG. 3 is a flowchart useful for understanding the operation as a first host terminal detects a link with a network in the system shown in FIG. 1.

Next, the operation of the VoIP network system 10 of the illustrative embodiment will be described with reference to a sequence chart shown in FIG. 2. Particularly, the operation as the host terminal 16 detects a link with the network 12 will be described with reference to a flow chart shown in FIG. 3.

In the illustrative embodiment, although the host terminals 18 and 20 in the VoIP network system 10 are in the same site local network area as the host terminal 16, it is assumed that they are in different link local areas.

In the instant embodiment, if the host terminal 16 is started, predetermined comparative or reference values in the connection-time determiner 24, which consist of a shortest multicast transmission interval Ti and an initial value, e.g. "0", for link disconnection time Tb, are first stored on a memory device, not shown.

The host terminal 16 is held in the state in which it is connectable with the network 12, and the connection of the terminal 16 with the network 12 results in the detection of the establishment of a link therebetween (step S102). At the same time, in step S132, the connection-time determiner 24 obtains link establishment time Tn according to the detection of this link establishment.

In step S134, the connection-time determiner 24 determines the time required for the host terminal 16 to reconnect with the network 12 (step S104), and in the illustrative embodiment, the connection-time determiner 24 compares a difference between the link establishment time Tn and the disconnection time Tb with the comparative value Ti. This comparison may be made, for example, by an equation Ti<Tn−Tb. When the difference Tn−Tb exceeds the comparative value Ti, the determiner 24 determines that its own address information should be transmitted, because the time required for connection is long and exceeds a given period of time. Otherwise, in step S136, the determiner 24 determines that its own address information should not be transmitted, because the time required for connection is short and within the given period of time, and the host terminal 16 concludes the link-detecting operation.

For example, when the disconnection time Tb is its initial value "0", the establishment time Tn is not less than the comparative value Ti and therefore the host terminal 16 advances to step S136.

In step S136, the host terminal 16 transmits its own address information by the multicast communication. More specifically, the host terminal 16 generates a multicast packet indicating its own address information such as its own telephone number, IP address, and SIP URI, and transmits the multicast packet to other host terminals 18, 20, and 22 and router 14 through the connecting line 30 (step S106).

If the address information is transmitted as described above, in step S138, the host terminal 16 obtains the transmission completion time as the disconnection time Tb, stores it on the memory device, not shown, and ends the link-detecting operation.

In the illustrative embodiment, when the host terminal 16 is started, the link disconnection time Tb is set to its initial value "0", but the link disconnection time Tb obtained in the previous operation of the host terminal 16 may be held as it is. The host terminal 16 may also allow a user to set the predetermined comparative value Ti.

Figure 4:
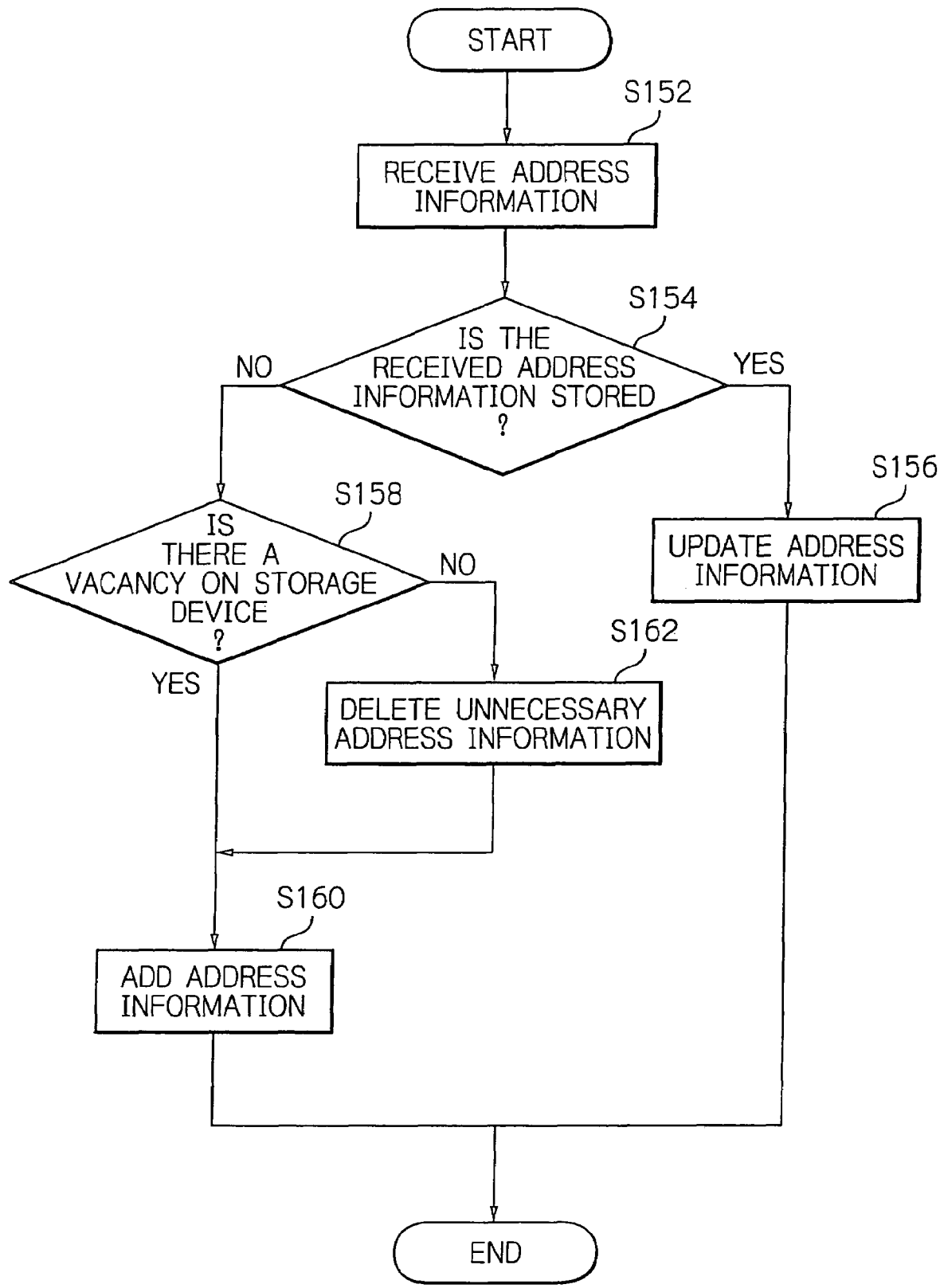
FIG. 4 is a flow chart useful for understanding the operation as second and third host terminals receive address information from the first host terminal in the system shown in FIG. 1.

In the VoIP network system 10 of the illustrative embodiment, the operation as the host terminals 18 and 20 receive address information from the host terminal 16 will be described with reference to a control flow shown in FIG. 4.

In the illustrative embodiment, if the host terminals 18 and 20 connect with the network 12 to establish a link with the network 12, the host terminals 18 and 20 are held in the state in which they are able to receive address information from other host terminals. In this state, in step S152, the address information transmitted by the host terminal 16 (steps S106 and S136, FIGS. 2 and 3, respectively) is received by the host terminals 18 and 20, whereby an address information receiving process (step S108) is carried out.

In the address information receiving process, the reception time is recorded as the time-stamp, and the host terminals 18 and 20 advance to step S154.

In step S154, in the host terminals 18 and 20 it is determined whether or not the address information received from the host terminal 16 has already been stored on the storage area or device. When the address information corresponding to the host terminal 16 is detected from the storage device, the host terminals 18 and 20 advance to step S156. When it is not detected, they advance to step S158.

In step S156, in the host terminals 18 and 20, the time-stamp of the received address information is compared with that of the corresponding address information stored on the storage device, and the address information with the newer of the two time-stamps is stored and updated on the storage device. After the storage device is updated in this manner, the address information receiving process ends.

In step S158, in the host terminals 18 and 20, the vacant capacity of the storage area or device is determined, and based on a result of the determination, it is determined whether or not there is a vacancy for adding and storing the received address information. At this stage, if there is a vacancy on the storage device, the host terminals 18 and 20 advance to step S160, in which the address information received in each of the host terminals 18 and 20 is added and stored on the storage device. Thus, the address-information receiving operation ends. On the other hand, there is no vacancy on the storage device, the host terminals 18 and 20 advance to step S162.

In step S162, to ensure a vacancy on the storage device, among all address information already stored, unnecessary information is determined and deleted. More specifically, in the host terminals 18 and 20, unnecessary address information is determined according to the time-stamp of address information already stored on the storage device and/or the transmission-reception history. For example, plural pieces of address information that are smallest in the number of transmissions and receptions are determined, and among those pieces of information, the address information received at the oldest time-stamp is determined unnecessary. In the host terminals 18 and 20, the unnecessary address information thus determined is deleted from the storage device. In step S160, the address information received in each of the host terminals 18 and 20 is added and stored to and on the vacant region ensured on the storage device, whereby the address-information receiving operation ends.

Figure 5:
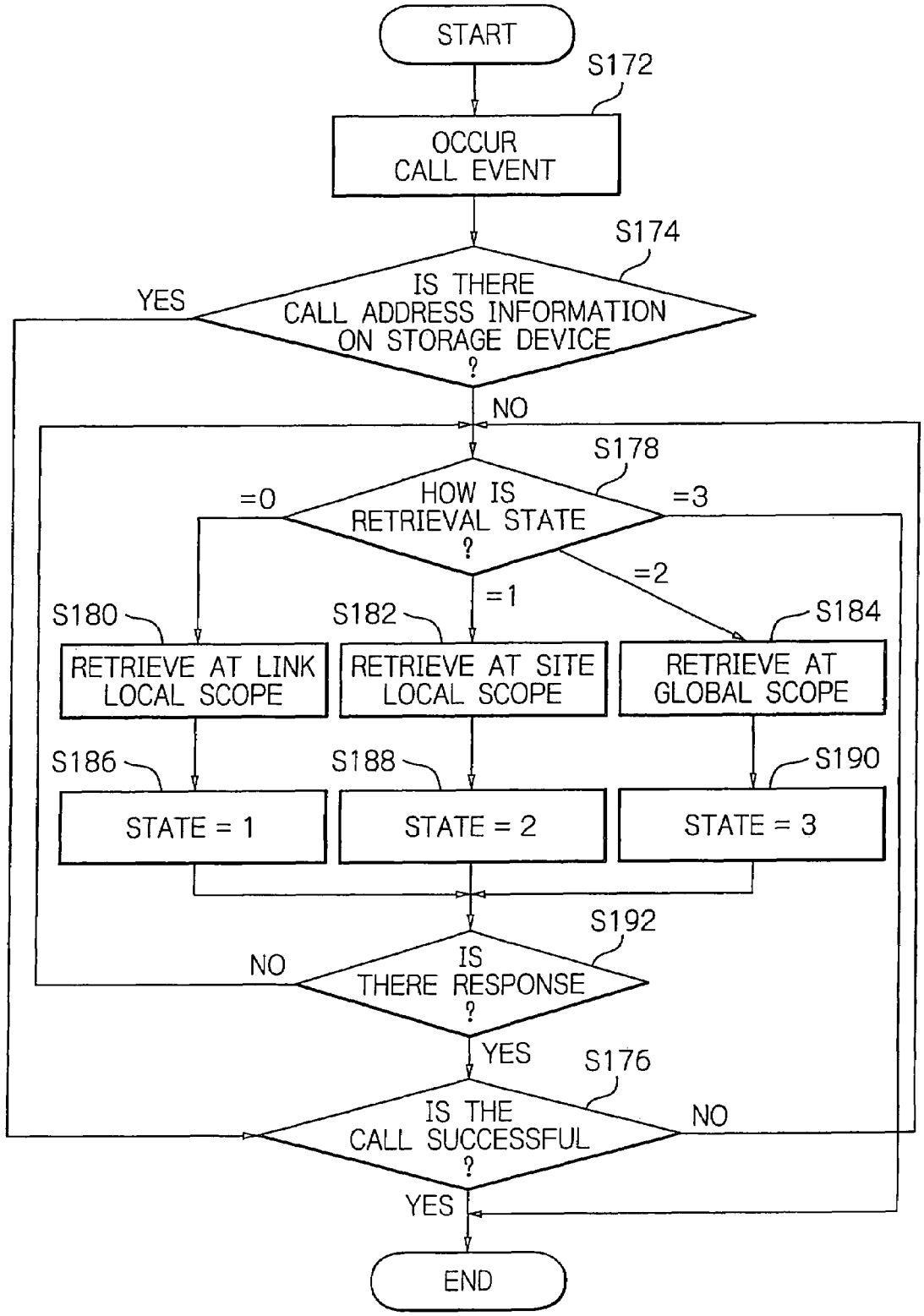
FIG. 5 is a flowchart useful for understanding the operation as the first host terminal establishes a call connection with other host terminals by multicast communication in the system shown in FIG. 1.

In the VoIP network system 10 of the illustrative embodiment, the operation as the host terminal 16 causes a call connection to be established to other host terminals by the multicast communication will be described with reference to a control flow shown in FIG. 5. It is assumed that other host terminals 18 and 20 belong to the same multicast group as the host terminal 16 and are located outside the link local area to which the host terminal 16 belongs, and further both of them are located within a site local area broader than the link local area.

In the illustrative embodiment, if the user dials and inputs a telephone number by manipulating the host terminal 16 (step S112), the host terminal 16 causes a call originating event to occur in step S172.

Next, in step S174, the host terminal 16 references the storage device and finds out destination address information that corresponds to the input telephone number (step S114). When there is destination address information in the storage device, the host terminal 16 advances to step S176. When there is no destination address information found out, the host terminal 16 advances to step S178.

In the step S176, the host terminal 16 obtains an address, such as an IP address or SIP URI, from the destination address information detected from the storage device, and originates a call by the unicast communication to the obtained address, thereby making a request to connect to the other, i.e. called host terminal. If the other host terminal receives this call, a reception response from that called host terminal is supplied to the calling host terminal 16. In response to the supplied reception response, the calling host terminal 16 determines the call origination successful, and finishes the call-connecting operation because a call connection is now established to the called host terminal. On the other hand, when the call connection is not successful to the called host terminal, the calling host terminal 16 fails to receive a reception response, and thus determines the call origination unsuccessful and advances to step S178.

In step S178, the host terminal 16 determines the scope of the search for destination address information corresponding to an input telephone number and searches link local scope, site local scope, and global scope in the recited order.

The host terminal 16 of the illustrative embodiment employs, for example, a search state variable whose initial value is "0", and determines the scope of the search according to the value of the search state. When the value of the search state is "0", "1", or "2", the search scope is link local scope, site local scope, or global scope. When the value of the search state is "3", the host terminal 16 completes the search to finish the call-connecting operation.

In the illustrative embodiment, the search state first indicates an initial value, "0". Therefore, in step S180, search information containing an input telephone number is transmitted by the multicast communication to the link local scope to search for the destination host terminal (step S116).

For example, after the search information has been sent, in step S186, the host terminal 16 adds "1" to the search state to perform the next search, thereby setting the value of the search state to "1".

Subsequently, in step S192, the host terminal 16 performs a determination of response of whether or not there has been a response to the search information transmitted. The host terminal 16 may perform the determination of response, for example, after a predetermined standby time has elapsed since the search information was sent.

In the illustrative embodiment, the other, i.e. appropriate host terminal does not reside in the link local scope, thus rendering no response to the search information (step S118). Returning to step S178, the host terminal 16 determines the search scope again to decide a broader search scope.

At this stage, the value of the search state is "1". Therefore, in step S182, the host terminal 16 transmits the search information by the multicast communication to the site local scope to search for the destination host terminal (step S120). As with step S186, in step S188 after the transmission of the search information, the host terminal 16 adds "1" to the search state to perform the next search, thereby setting the value of the search state to "2".

Next, in step S192, the host terminal 16 performs the response determination again. In the illustrative embodiment, the host terminal 16 receives responses to the search information from other host terminals 18 and 20 present in the site local scope (step S122).

As described above, in the case where there are responses from plural other host terminals, the host terminal 16 may reference the time-stamps, e.g. reception times, of these responses, select the newest one, and determine the latter to be the response sent by the destination host terminal.

After determining the destination host terminal by the response from the other host terminal, the control proceeds to step S176, in which a call is originated from the host terminal 16 toward the destination host terminal, that is, the destination address indicated by the response.

When that calling is unsuccessful, the host terminal 16 selects as a destination host terminal such one of the other, i.e. appropriate host terminals responding from the same scope which has the second newest time-stamp, and then calls that destination address indicated by that response. If call originations to these responses made by the host terminals are entirely unsuccessful, then the control returns to step S178 where the host terminal 16 retries to determine the search scope to determine a broader search scope.

When the call origination is successful, a call connection, i.e. speech signal transmission is allowed between the calling host terminal 16 and the destination host terminal, thus concluding the call-connecting operation (step S124).

Although not described in detail, in the case where the value of the search state in step S178 is "2", as with the aforementioned, in step S184 the host terminal 16 transmits by the multicast communication the search information to the global scope, and in step S190 the host terminal 16 adds "1" to the value of the search state to perform a future search, thereby setting the value of the search state to "3".

Figure 6:
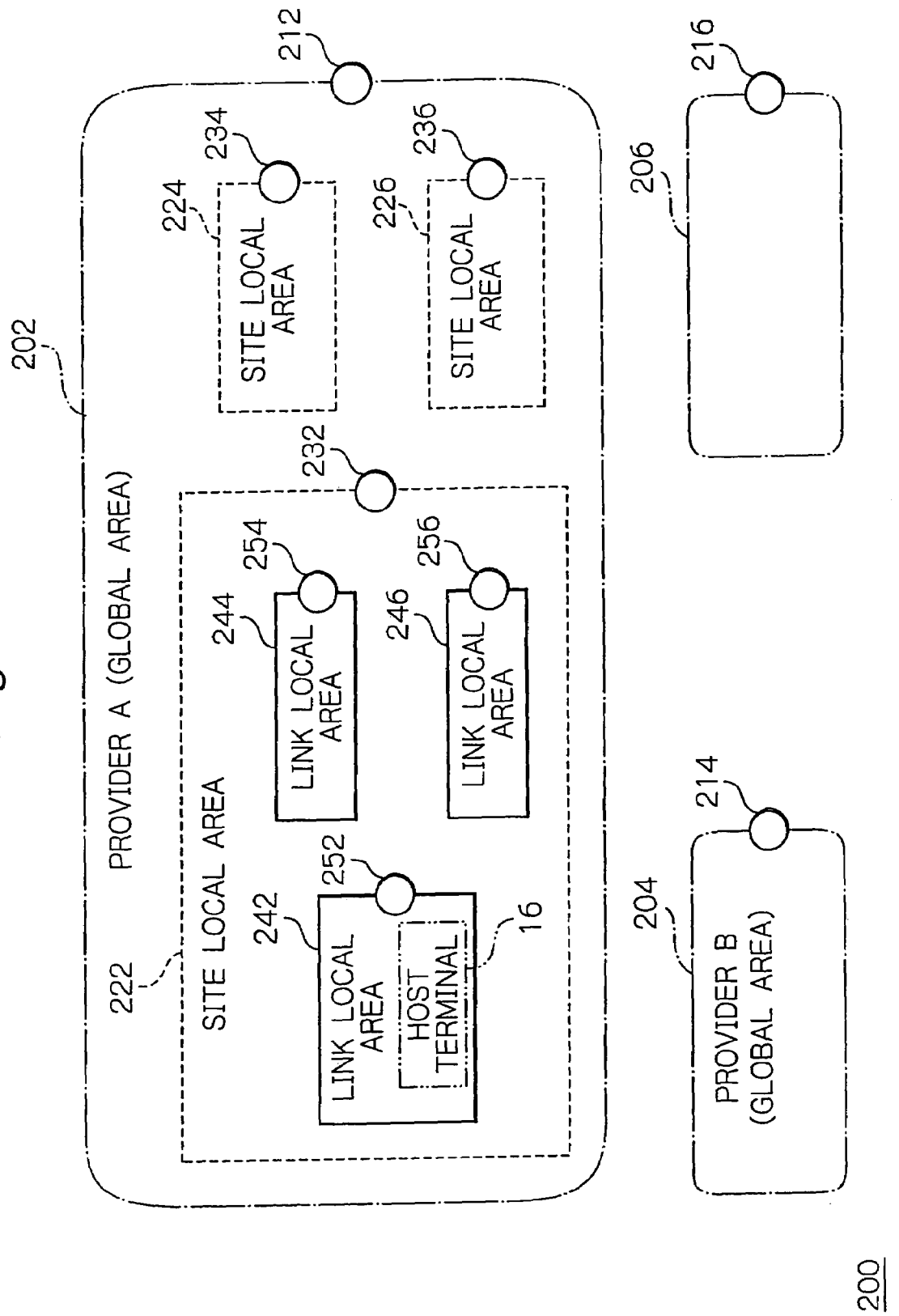
FIG. 6 is a schematic block diagram showing an example of a superordinate network to which the VoIP network shown in FIG. 1 is applied.

The VoIP network system 10 of the present invention is applicable to another type of network, e.g. 200, FIG. 6, which may include a plurality of link local areas, site local areas, and global network areas. As shown in the figure, the network 200 includes a plurality of providers 202, 204, and 206. These providers have respective routers 212, 214, and 216, and form respective global network areas.

The global area 202 may also be formed from a plurality of site local areas 222, 224, and 226. These site local areas have respective routers 232, 234, and 236. The global areas 204 and 206 may likewise include a plurality of site local areas.

The site local scope 222 may be formed from a plurality of link local areas 242, 244, and 246 respectively having routers 252, 254, and 256. The site local areas 224 and 226 may similarly include a plurality of link local areas.

The entire disclosure of Japanese patent application No. 2006-165764 filed on Jun. 15, 2006, including the specification, claims, accompanying drawings and abstract of the disclosure, is incorporated herein by reference in its entirety.

While the present invention has been described with reference to the particular illustrative embodiment, it is not to be restricted by the embodiment. It is to be appreciated that those skilled in the art can change or modify the embodiment without departing from the scope and spirit of the present invention.

What is claimed is:

1. A VoIP (Voice over Internet Protocol) network system of a peer-to-peer type in which a plurality of host terminals transmit or receive packets by multicast communication to one another, wherein each of said plurality of host terminals comprises a connection-time determiner for determining, if said host terminal detects a link with a network of said system, time required for reconnection from disconnection time when a link with the network was disconnected before to establishment time when a link with the network is reestablished; and said host terminal is responsive to a result of the determination obtained by said connection-time determiner to transmit self-address information of said host terminal by the multicast communication to another of said plurality of host terminals.

2. The VoIP network system in accordance with claim 1, wherein said connection-time determiner determines, if the time required for reconnection is shorter than a predetermined period of time, that the self-address information is not to be transmitted, and otherwise that the self-address information is to be transmitted.

3. The VoIP network system in accordance with claim 2, wherein said connection-time determiner has a predetermined reference value indicating the predetermined period of time; stores the disconnection time when said host terminal disconnects a link with the network; obtains the establishment time when said host terminal establishes a link with the network; and determines, when a difference between the establishment time and the disconnection time exceeds the predetermined reference value, that the self-address information should be transmitted, and otherwise that the self-address information should not be transmitted.

4. The VoIP network system in accordance with claim 1, wherein said system transmits or receives the packets by the multicast communication under an environment of IPv6 (Internet Protocol version 6).

5. The VoIP network system in accordance with claim 1, wherein said system employs a session initiation protocol (SIP).

6. The VoIP network system in accordance with claim 1, wherein each of said plurality of host terminals includes a storage area for storing other-address information of another of said plurality of host terminals, each of said plurality of host terminals comprising an other-information determiner for determining, when receiving the other-address information from said other host terminal, the received other-address information to store the received other-address information in said storage area according to a result of the determination.

7. The VoIP network system in accordance with claim 6, wherein said other-address information determiner comprises:

an updating section for referencing said storage area to determine whether or not address information corresponding to the received other-address information has already been stored, said updating section updating, when the corresponding address information is found out from said storage area as a result of the determination, contents of said storage area according to the received other-address information; and an adding section for additively storing, when the corresponding address information is not found out, the received other-address information in said storage area.

8. The VoIP network system in accordance with claim 7, wherein said host terminal records, when receiving the other-address information from said other host terminal, a time-stamp of reception time of the other-address information;

said updating section comparing time-stamps of the received other-address information and the corresponding address information with each other, and storing and updating a newer of the received other-address information and the corresponding address information;

said adding section determining, if said storage area has no vacancy for storing the received other-address information, that, among all address information already stored in said storage area, address information which is smallest in number of transmissions and receptions and older in time-stamp is unnecessary information to delete the unnecessary information; and thereafter additively storing the received other-address information in said storage area.

9. The VoIP network system in accordance with claim 1, wherein said host terminal comprises a call controller operative in response to a telephone number of said other host terminal input for obtaining destination address information corresponding to the input telephone number, and originating a call by unicast communication to an address indicated by the destination address information to thereby allow a call connection to be established to said other host terminal;

said call controller referencing said storage area based on the input telephone number, retrieving and obtaining the destination address information, and obtaining, when the destination address information is not found out, destination address information according to a retrieval result obtained when said retrieval section locates a destination host terminal having a telephone number corresponding to the input telephone number;

said retrieval section transmitting retrieval information containing the input telephone number by the multicast communication to another of said plurality of host terminals, and obtaining, when said destination host terminal transmits its address information in response to the retrieval information, the transmitted address information as the destination address information;

at this time, said retrieval section first sending out the retrieval information to a narrower retrieval scope, and, if there is no response to the retrieval information, then broadening the retrieval scope, and sending out the retrieval information, thereby retrieving said destination host terminal.

10. The VoIP network system in accordance with claim 9, wherein said retrieval section broadens the retrieval scope in an order of link local scope, site local scope, and global scope.

11. The VoIP network system in accordance with claim 9, wherein, when said retrieval section receives responses to the retrieval information from at least two of said other host terminals, said retrieval section determines time-stamps of reception times of the responses to obtain newest one of the responses as the destination address information.

12. A method of constructing a network of a VoIP (Voice over Internet Protocol) network system of a peer-to-peer type in which a plurality of host terminals transmit or receive packets by multicast communication to one another, said method comprising:

a connection-time determining step of determining, if one of the host terminals detects a link with the network, time required for reconnection from disconnection time when a link with the network was disconnected before to establishment time when a link with the network is reestablished;

said connection-time determining step transmitting, according to a result of the determination of the time required for reconnection, self-address information of the one host terminal by the multicast communication to another of the host terminals.

13. The method in accordance with claim 12, wherein said connection-time determining step determines, if the time required for reconnection is shorter than a predetermined period of time, that the self-address information is not to be transmitted, and otherwise that the self-address information is to be transmitted.

14. The method in accordance with claim 13, wherein said connection-time determining step obtains the establishment time when the host terminal establishes a link with the network, by employing a predetermined reference value that the host terminal has, and employing the disconnection time stored when the host terminal disconnects a link with the network;

said connection-time determining step determining, when a difference between the establishment time and the stored disconnection time exceeds the predetermined reference value, that the self-address information should be transmitted; and otherwise that the self-address information should not be transmitted.

15. The method in accordance with claim 12, wherein the system transmits or receives the packets by the multicast communication under an environment of IPv6 (Internet Protocol version 6).

16. The method in accordance with claim 12, wherein the system employs a session initiation protocol (SIP).

17. The method in accordance with claim 12, further comprising an other-information determining step of using a storage area included in the one host terminal and storing other-address information of the other host terminal, said other-information determining step determining, when other-address information is received from the one other host terminal, the received other-address information to store the received other-address information in the storage area according to a result of the determination.

18. The method in accordance with claim 17, wherein said other-address information determining step comprises:

an updating substep of referencing the storage area to determine whether or not address information corresponding to the received other-address information has already been stored, and updating, when the corresponding address information is found out from the storage area as a result of the determination, the storage area according to the received other-address information; and an adding substep of additively storing, when the corresponding address information is not found out, the received other-address information in the storage area.

19. The method in accordance with claim 18, wherein the one host terminal records, if the host terminal receives other-address information from the other host terminal, a time-stamp of reception time of the other-address information;

said updating step comparing time-stamps of the received other-address information and the corresponding address information with each other, and storing and updating a newer of the received other-address information and the corresponding address information;

said adding step determining, if the storage area includes no vacancy for storing the received other-address information, that, among all address information already stored in the storage area, address information which is smallest in number of transmissions and receptions and older in time-stamp is unnecessary information to delete the unnecessary information; and thereafter additively storing the received other-address information in the storage area.

20. The method in accordance with claim 12, further comprising a conversion step of obtaining, when the one host terminal receives a telephone number of the other host terminal, destination address information corresponding to the input telephone number, and originating a call by unicast communication to an address indicated by the destination address information to thereby allow a call connection to be established to the other host terminal;

said conversation step referencing the storage area based on the input telephone number, retrieving and obtaining the destination address information, and obtaining, when the destination address information is not found out, the destination address information according to a retrieval result obtained by a retrieval step of locating a destination host terminal having a telephone number corresponding to the input telephone number;

said retrieval step transmitting retrieval information containing the input telephone number by the multicast communication to other host terminals, and obtaining, when the destination host terminal transmits its address information in response to the retrieval information, the transmitted address information as the destination address information; and at this time, said retrieval step first sending out the retrieval information to a narrower retrieval scope, and, if there is no response to the retrieval information, then broadening the retrieval scope and sending out the retrieval information, thereby retrieving the destination host terminal.

21. The method in accordance with claim 20, wherein said retrieval step broadens the retrieval scope in an order of link local scope, site local scope, and global scope.

22. The method in accordance with claim 20, wherein, when said retrieval step receives responses to the retrieval information from at least two of the other host terminals, said retrieval step determines time-stamps of reception times of the responses and obtains newest one of the response as the destination address information.

* * * * *